United States Patent Office 2,967,897
Patented Jan. 10, 1961

2,967,897

ISOPRENE PREPARATION

Dexter B. Sharp, Vandalia, and John R. Le Blanc, Dayton, Ohio, assignors to Monsanto Chemical Company, St. Louis, Mo., a corporation of Delaware No Drawing. Filed Nov. 13, 1957, Ser. No. 696,062

8 Claims. (Cl. 260—681)

The present invention is directed to a process of preparing isoprene from 2-methyl-2-butene by photoxidizing the 2-methyl-2-butene in the presence of a photosensitizer to hydroperoxides, reducing the hydroperoxides to allylic alcohols and dehydrating the allylic alcohols to isoprene.

The invention is further directed to the process of photoxidizing 2-methyl-2-butene in the presence of a photosensitizer to 2-methyl-3-buten-2-yl hydroperoxide and 3-methyl-3-buten-2-yl hydroperoxide, and is directed to the latter compounds as novel intermediates which are useful in the production of isoprene.

The invention is further directed to reduction of the said hydroperoxides to the corresponding allylic alcohols by use of sodium sulfite, particularly in aqueous alkaline solution.

The invention is further directed to the dehydration of 2-methyl-3-buten-2-ol and mixtures of 2-methyl-3-buten-2-ol and 3-methyl-3-buten-2-ol to isoprene by passing the vapor of the said alcohols over hot magnesium sulfate to obtain isoprene of very high purity in good yield.

The terms "photoxidizing," "photoxidation," "photosensitized," etc., as used herein in the specification and claims are intended to cover true photosensitized oxidation reactions in which light in the presence of a photosensitizing catalyst causes the oxidation; the terms are not intended to include autoxidations, proceeding by a free radical mechanism in which irradiation with light serves to initiate free radicals. The true photosensitized oxidation reactions are characterized by the fact that the rate of the reaction is proportional to the intensity of irradiation at both high and low intensities, and the fact that ordinary oxidation inhibitors do not retard the reaction.

The object of the present invention is to provide an efficient method of converting an isopentene to isoprene of high purity. It has recently been demonstrated that isoprene is a very valuable monomer as by its polymerization, a synthetic rubber (cis-isoprene) can be produced which has the properties of natural rubber (Horne et al., Ind. Eng. Chem., 48, 784 (1956); Stavely et al., Ind. Eng. Chem. 48, 778 (1956)). As this polymerization requires very pure isoprene, a great deal of research effort is presently being devoted to the problem of how efficiently to prepare isoprene of high purity from hydrocarbon fractions.

The importance of this problem can be seen from a recent literature note (Ind. Eng. Chem., 49, No. 1, 39A, January 1957) which explains that a large roadblock standing in the way of commercial development of cis-isoprene is the lack of a large scale monomer supply, and that, as the polymerization requires isoprene of fantastically high purity, every pound of commercial isoprene used must be specially purified; and that to make cis-isoprene a commercial success, a source of high-purity isoprene must be developed.

The overall process of the present invention can be illustrated by the following equations:

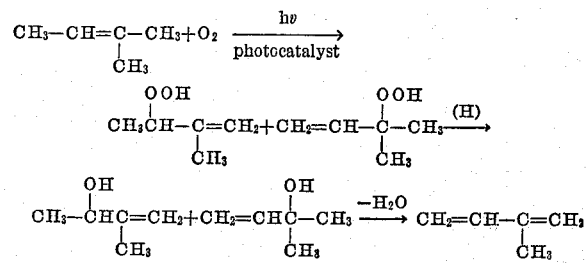

In the above novel route to isoprene, it is not necessary to separate the intermediate compounds from each other or to extensively purify any of the intermediate compounds before proceeding with the next step. Of course, the intermediates can be isolated and purified if desired. In general, a simple distillation of the intermediates from their reaction mixtures is sufficient. Similarly, isoprene of high purity is obtained by simple distillation, i.e., vaporization, from the reaction mixture. By contrast, the common prior art processes require extensive isolation and purification procedures to obtain isoprene of high purity; for example, the two-step cracking of isopentane produces an impure isoprene containing mixtures of reactants and products which are difficult to remove.

Example 1

In a 600-ml., flat-sided, cylindrical, three-neck flask fitted with a thermometer, a hollow-shaft, high-speed, gas-dispersing stirrer and connected to a Dry Ice-cooled reflux condenser was placed 396 grams (5.66 moles) of 2-methyl-2-butene (technical grade, Phillips Pet., containing 4% 2-methyl-1-butene and 1.4% n-pentenes). $\alpha,\beta,\gamma,\delta$-Tetraphenylporphin, 0.02 gram in 10 ml. benzene, was then added. While the reaction flask was illuminated with two 500-watt Photospot tungsten lamps (G.E. RSP2), air was passed into the flask at a rate of the order of 1 cu. ft./hr. for 10 hours. The amount of oxygen absorbed was 1.144 moles (as measured by difference between oxygen gas metered into the flask and that leaving the flask). The final weight of the reaction mixture was 425 grams. An aliquot (25%) of the reaction product was distilled through a pot-Penn State head assembly, indicating that the reaction produced 1.41 moles of 2- and 3-methyl-3-buten-2-yl hydroperoxides distilling at 42–44° C./4–9 mm., for a yield of 78.3%; the conversion was 24.9%, 2.86 moles of 2-methyl-2-butene being recoverable.

*Analysis.*—Calcd. for $C_5H_{10}O_2$: C, 58.87; H, 9.88; Peroxide, 100. Found: C, 58.77; H, 9.84; Peroxide, 98.4.

The two hydroperoxide isomers were identified further by infrared spectra which clearly indicated the presence of the two hydroperoxides by vinyl and vinylidene hydrogen bands at 924 and 995 cm.$^{-1}$ and 905 cm.$^{-1}$, respectively; whereas 2-methyl-2-butene has only the trisubstituted olefin band at 803 cm.$^{-1}$ which is absent in the hydroperoxide mixture; by the OH band at 3330 cm.$^{-1}$, and by the peroxide oxygen band at 843 cm.$^{-1}$. By comparing the amount of oxygen which must have been absorbed in the reaction mixture as determined by the amount required to form 1.41 moles of hydroperoxides, with the observed weight gain of the reaction mixture, it was concluded that there was a loss of 2-methyl-2-butene due to entrainment amounting approximately to the difference in these values. The correctness of this conclusion is indicated by absence of any other products and the negligible distillation residue. Making an allowance for this loss, the yield is 98.6%. The entrainment loss can be prevented by use of a closed system, use of more efficient or more extensive condensation apparatus, or similar measures. The gases (air) coming into and leaving the reaction flask were metered by wet test meters, the readings in cubic feet being taken periodically, along with temperature and pressure readings; the volume of gas in cubic feet was then converted to moles of gas at standard temperature and pressure.

During the above photoxidation procedures, the reaction flask was immersed in a glass water bath fitted for continuous tap-water cooling. The tungsten lamps were directed through the water at the flat sides of the reaction flask. Air was humidified (for purposes of metering only) and metered into the flask through a wet test meter. The exit stream passed through the low temperature reflux condenser, then through a Dry Ice-cooled trap in series with a humidifier and the second wet test meter. The amount of gas absorption was measured by the difference in the wet test meter readings.

Example 2

A 1-liter, 3-necked flask was fitted with a thermometer, stirrer, addition funnel, and a reflux condenser which was connected to two Dry Ice-cooled traps in series. The flask was charged with 1.89 grams (1.5 mole) of sodium sulfite in 400 ml. water which was then heated to reflux. A 290-gram portion of the photoxidation reaction mixture of Example 1 composed of about 102 grams of 2- and 3-methyl-3-buten-2-yl hydroperoxides and 188 grams of 2-methyl-2-butene was placed in the addition funnel and added dropwise to the reaction flask. The temperature in the reaction flask dropped to 45° C. as 2-methyl-2-butene distilled over into the Dry Ice-cooled traps. The hydroperoxide solution was added dropwise over a 1.5-hour period, as the reflux temperature gradually rose to 85° C. The reaction mixture was stirred as gentle reflux for an additional 3.5 hours, at which time a negative test for peroxide was obtained. The organic layer and aqueous layer of the reaction mixture were separated, and the aqueous layer was extracted with ether, and the extracts were combined with the organic layer. Upon distilling the organic layer, 53 grams of 2- and 3-methyl-buten-2-ols was obtained at 82 to 114° C'/atmospheric and 32–33° C./15 mm., $n_D^{25}$ 1.3962–1.4253. The yield of the two isomeric alcohols was 61.6% based upon the hydroperoxides charged; the conversion was also 61.6%. The two alcohols were identified by infrared spectra. A 200-gram amount of 2-methyl-2-butene (containing some water) was recovered from the reaction. It will be advantageous to recycle this 2-methyl-2-butene to the photoxidation reaction, particularly when the reactions are conducted as a continuous reaction; the 2-methyl-2-butene can simply be distilled from the reaction mixture and recirculated to the photoxidation step, while the 2- and 3-methyl-butene-2-ols go on to the dehydration step.

Example 3

In a procedure similar to that of Example 1, 459 grams of 2-methyl-2-butene was treated with oxygen (rather than air) at 21–26° C. under illumination of 4 tungsten lamps (2 at each end of flask) in the presence of 0.023 gram of $\alpha,\beta,\tau,\delta$-tetraphenylporphin (added as solution in 4 ml. benzene). In 14 hours, 3.054 moles of oxygen was absorbed, and the weight of the reaction mixture increased by 93.5 grams; (this indicates an entrainment loss of 4.3 grams as 3.05 moles of oxygen should have increased the weight of 97.8 grams). Upon distilling the product through a helices-packed column, 2.86 moles of 2- and 3-methyl-3-buten-2-yl hydroperoxides was obtained at 34–38° C./4–9 mm., $n_D^{25}$ 1.4211–1.4310, for a yield of 85.0%. About 20 grams of material was lost due to column hold-up. The conversion was 43.6%, 3.19 moles of 2-methyl-2-butene being recovered. It will be noted that increasing the number of irradiating lights from two to four nearly doubled the conversion over that of Example 1.

A portion of the above 2- and 3-methyl-3-buten-2-yl hydroperoxide mixture was then reduced by a procedure similar to that of Example 2. The hydroperoxides, 204 grams, 302.4 grams of sodium sulfite in 800 ml. water and an amount of sodium hydroxide stoichiometrically equivalent to the sodium sulfite were reacted at 22 to 28° C. for 17 hours, and the reaction mixture was then heated to 50° C. for 1 hour. The organic product was reacted with ether, washed successively with water and saturated brine (NaCl/water) and dried over magnesium sulfate. Distillation, following ether removal, gave 145 grams of 2- and 3-methyl-3-buten-2-ols, at 57–33° C./ 13–143 mm., $n_D^{25}$ 1.3964–1.4258, for a conversion and yield of 84.2%. The isomers were identified by fractional distillation, vapor-phase chromatographic separation and infrared spectra. Fractional distillation gave one fraction with B.P. range of 93–98° C./1 atm., $n_D^{25}$ 1.4108, which by vapor-phase chromatographic analysis contained 13% water, 84% 2-methyl-3-buten-2-ol (tertiary alcohol) and 3% 3-methyl-3-butene-2-ol. Vapor-phase chromatographic separation of the major fraction was carried out, and the infrared spectrum of this pure compound was obtained. Tertiary alcohol character was indicated by strong infrared absorption at 1160 cm.$^{-1}$, and the unsaturation characteristic of a vinyl (i.e., monosubstituted ethylenic double bond, R—CH=CH$_2$) was shown by strong absorption bands at 995 and 920 cm.$^{-1}$. A higher boiling fraction of this alcohol mixture, B.P. range 32–33° C./15 mm., $n_D^{25}$ 1.4253 was 99+% 3-methyl-3-buten-2-ol by vapor-phase chromatographic analysis. Its infrared spectrum showed strong absorptions at 1295 and 1110 cm.$^{-1}$, indicative of secondary alcohol; and at 895 cm.$^{-1}$, indicative of the vinylidene group (1,1-disubstituted ethylenic double bond). As further identification, the 2-methyl-3-buten-2-ol properties correspond to those listed in the literature (reported B.P. 97° C.) as do the properties of 3-methyl-3-buten-2-ol (reported B.P. 115–117° C., $n_C^{17}$ 1.4288). A portion of the above 2- and 3-methyl-3-buten-2-ol mixture was reduced by dehydration over magnesium sulfate. A 6-inch, 17-mm. I.D. Pyrex column fitted with a concentric heating jacket wrapped with Chromel heating element, and an outer jacket, was filled with a dehydration catalyst, anhydrous magnesium sulfate pellets (12 grams). The temperature of the column was controlled by a potentiometer (Variac), and measured by an iron-constantan thermocouple, with the junction in a well in the middle of the wall of the Pyrex column. The system was blown with dry nitrogen at about 250° C. for 1½ hours. The 2- and 3-methyl-3-buten-2-ol mixture was then added dropwise to the column, 15.1 grams being added in a 2.8 hour period to the column heated at 244–260° C. The isoprene was collected in Dry Ice-cooled and liquid nitrogen-cooled receivers in series connected to the discharge (lower) end of the catalyst column, 11.2 grams being obtained. A direct vapor chromatographic analysis of this product indicated that the $C_5$ hydrocarbon fraction was of very high purity, better than 99% isoprene (the total collected product contained 96+% isoprene and about 4% methyl isopropenyl ketone which is readily separable therefrom by ordinary distillation). The infrared spectrum of this product was identical with a published standard infrared reference spectrum for authentic isoprene. The yield in the dehydration step was 94.1%. The overall yield in this example of the conversion of 2-methyl-2-butene to isoprene was 67.4%. It will be possible to achieve even better overall yields by making certain improvements which the data herein indicate to be desirable, and by otherwise determining optimum conditions now that the procedure has been shown to be feasible.

Example 4

In a reduction procedure similar to that of Example 2, 51 grams (0.5 mole) of 2- and 3-methyl-3-buten-2-yl hydroperoxides were reduced by treatment with 75.6 grams (0.6 mole) of sodium sulfite in 200 ml. water also containing 20 grams (0.5 mole) of sodium hydroxide at room temperature for 20 hours, followed by heating to 48° C. for 1 hour. As product, 35 grams of 2- and 3-methyl-3-butene-2-ol was obtained at 41–60° C./14–122 mm., $n_D^{25}$ 1.3790–1.4260, for a yield and conversion of 81%. By vapor chromatographic analysis and infrared spectra the isomer content of the total distillate was determined to be 42% 3-methyl-3-buten-2-ol and 58% 3-methyl-3-buten-3-ol.

In a dehydration procedure similar to that of Example 3, 3-methyl-3-buten-2-ol obtained by fractional distillation of 2- and 3-methyl-3-buten-2-ol was contacted in the vapor phase with magnesium sulfate catalyst at 251–254° C., 1.7 grams of the alcohol being added to the catalyst over a 0.25-hour period. Isoprene, 1.2 grams, of better than 98% purity was obtained, for a yield of approximately 88%.

Example 6

In a similar dehydration procedure, alumina ($Al_2O_3$) catalyst was contacted with 3-methyl-3-buten-2-ol at temperatures of 394–409° C. From the 3.3 grams of alcohol added to 20.5 grams of catalyst during a 0.5-hour period, 1.9 grams of isoprene was collected, for a yield of about 73%. The purity of the isoprene was about 86%.

Example 7

In a procedure similar to that of Example 6, 3.3 grams of 2-methyl-3-buten-2-ol was added to $Al_2O_3$ at 297–301° C. over a 0.2-hour period. Isoprene was obtained in an amount of 1.4 grams for a yield of 54%. The purity of the isoprene was better than 95%.

From Examples 6 and 7 it is apparent that even with an individual methyl-3-buten-2-ol the dehydration results over alumina are inferior to those obtained over magnesium sulfate with a mixture of methyl-3-buten-2-ols.

Example 8

Isopentane (technical grade, Phillips Petroleum) in the gaseous state was passed over microspheroidal alumina-chromia catalyst (20% $Cr_2O_3$, Harshaw Chemical) to cause dehydrogenation. At a temperature of 550° C. and contact time of 7.8 seconds, the following product distribution was obtained, the values being molecular percentages based on the isopentane feed:

| | |
|---|---|
| i-Pentane | 59.2 |
| 2-Methyl-1-butene | 10.9 |
| 2-Methyl-2-butene | 15.4 |

The condensed product can then be photoxidized according to the procedure of Example 1 to convert substantially all of the 2-methyl-2-butene to hydroperoxides. The isopentane and 2-methyl-1-butene are then permitted to distill together from the reaction mixture and are returned to the dehydrogenation step; or, alternatively, the hydrocarbon mixture containing 2-methyl-1-butene substantially free of 2-methyl-2-butene can be used as a feed source for other reactions requiring the 2-methyl-1-butene. Instead of separating the unphotoxidized hydrocarbons following the photoxidation step as above, the reaction mixture can be carried through the reduction procedure of Example 2 to reduce the hydroperoxides to alcohols, and the hydrocarbons can then be separated and recycled to the dehydration step or utilized in other ways.

The dehydrogenation step above is ordinarily conducted at a temperature of the order of 500 to 600° C. The contact time will be sufficient to obtain the desired conversion and acceptable yields. In place of the alumina-chromia catalyst above, any other dehydrogenation catalyst capable of dehydrogenating hydrocarbons to olefins can be utilized.

The photoxidation reaction of the present invention can be postulated according to the following equations:

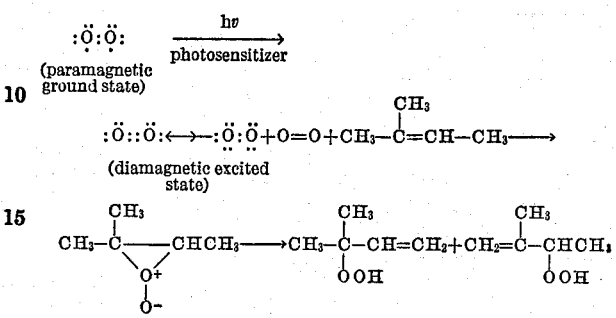

In these reactions a photosensitizer must be present to catalyze the conversion of the molecular oxygen in the ground state to an activated polarizable state. Light is also necessary to effect this reaction. The irradiating light can vary considerably in wave length, wave lengths in the visible regions being preferred. The light can be monochromatic or polychromatic. Light of wave lengths in the range of 3600 to 8000 Angstroms has been found very suitable. While light in the ultra-violet region, particularly the near ultra-violet region, can be used as it is effective to some extent in causing photoxidation, it is desirable to avoid use of light in these regions as it tends to catalyze autoxidations and other free-radical type reactions. High-energy, ultra-violet light may also cause accelerated catalyst photo-decomposition. The speed of the photoxidation reaction is proportional to the intensity of the irradiation; this relationship is very important, as it makes it possible to obtain reaction rates suitable for commercial production by merely providing high power light sources, for example, greater than 500–1000 watts. A number of compounds containing unsaturated double bonds have heretofore been reported to photoxidize to hydroperoxides. However, the prior reported compounds do not photoxidize to hydroperoxides with the rapidity and ease of 2-methyl-2-butene; the 2-methyl-2-butene photoxidizes readily despite the fact that it has a hindered structure in that there are three substituents on the double-bond carbon atoms. Actually, 2-methyl-2-butene displayed a photoxidizability as high as that of the most readily photoxidized monoolefin compounds tested, and 3 times greater than 4-methyl-2-pentene, about 5 times greater than 2-methyl-1-butene, and 5 times greater than cyclohexene. It also appears that light energy is efficiently utilized in the photoxidation of 2-methyl-2-butene as the quantum yield approaches 1. This remarkable photoxidizability is not only surprising, but it is essential to the economic success of the presently claimed process for preparing isoprene. Heretofore, catalytic photoxidation type reactions have not been used for the preparation of any materials in bulk quantities, because of the slowness and inefficiency of such reactions. However, the efficiency of the present catalytic photoxidation reaction of 2-methyl-2-butene is such as to make the reaction suitable for practical use.

The ease with which 2-methyl-2-butene is photoxidized is illustrated by the following example.

Example 9

A conventional Precision Warburg apparatus was provided with a double-circle 5,000-volt, "standard cool white," fluorescent light especially fabricated to fit the apparatus. This light was immersed in the constant temperature water bath to provide uniform illumination of the Warburg vessels from below. The following olefins were then photoxidized in the apparatus with air in the presence of the designated catalysts:

| Sample No. | Olefin | Catalyst |
|---|---|---|
| 1 | 2-methyl-2-butene | ms-tetraphenylporphin. |
| 2 | 2,3,3-trimethyl-1-butene | Do. |
| 3 | 4,4-dimethyl-cis-2-pentene | Do. |
| 4 | propylene trimer | ms-(4-nitrophenyl)porphin. |
| 5 | do | zinc ms-(4-dimethylaminophenyl)porphin. |

The olefins were used in an amount of 0.2 ml. and a 0.2-ml. solution of the catalysts was used (to give $1.17 \times 10^{-4}$ moles/liter of catalyst); pyridine, 2.6 ml., was added to bring the total solution up to 3.0 ml. The reaction rates were as follows:

OXYGEN ABSORBED (MICROLITERS)

| Sample No. | Time (Minutes) | | | | |
|---|---|---|---|---|---|
| | 15 | 30 | 45 | 60 | 75 (Dark) |
| 1 | 96 | 196 | 299 | 398 | 398 |
| 2 | 9 | 13 | 20 | 22 | 25 |
| 3 | 11 | 17 | 22 | 23 | 23 |
| 4 | 42 | 93 | 142 | 191 | 191 |
| 5 | 89 | 179 | 270 | 357 | 358 |

As thermobarometers, 3.0-ml. solutions containing all of the above components except the catalysts were used, and pressure changes noted for the cells containing these solutions were utilized in conventional manner in correcting the data obtained on the catalyst solutions to obtain the above values. A cell constant calculated conventionally as follows was also employed:

$$K_{O_2}^{298} = \frac{\frac{273}{298}Vg + \alpha V}{10}$$

in which $\alpha$ is the gaseous volume of oxygen soluble per volume of the solvent, $Vg$ is the volume of gas in the cell, $V$ is the volume of liquid in the cell, and the sum of these volumes equals the total volume; 298 is the absolute temperature (25° C.) at which the photoxidation was conducted.

It is possible to use any photoxidizing catalyst in the process of the present invention. Particularly useful catalysts for the purpose are compounds from the class of aromatic group meso-substituted porphyrin compounds which have been discovered to have exceptional photoxidizing activity.

Among such aromatic-substituted porphyrins are the ms-tetraarylporphyrins; porphyrins, of course, are the class of compounds in which four pyrrole nuclei are linked together in a circular pattern by four carbon atoms so that a great ring containing 16 atoms is formed; in the meso-tetraarylporphyrin catalysts, phenyl (or other aryl) groups are substituted on the bridging carbon atoms, such phenyl groups as for example phenyl, chlorophenyl dichlorophenyl, methylphenyl, N,N-dimethylaminophenyl, hydroxyphenyl; etc., are applicable; di-, tri-, and tetracyclic aryl groups can be used, e.g., meso-naphthyl-substituted porphyrins are very effective photosensitizing catalysts; anthracyl and phenanthryl groups are also effective. These catalyst compounds can be represented by the following formula in which R indicates an aryl group.

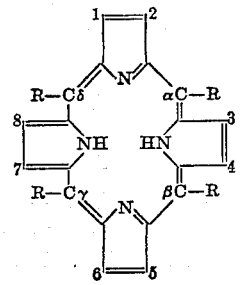

It will be recognized that the unsaturated system above is merely pictured in one of its possible resonance states, and that the double bonds can be at other positions. Of course, the porphyrins often have various other substituents, particularly at the numbered positions in the above formula, for example, such substituents as ethyl, methyl, vinyl, and propionic pyrrole acid groups, etc., or benzo groups linking two positions of a given pyrrole ring, and such substituents can be present in the tetraphenylporphyrin catalysts used in the present invention. In addition to the substituents in the phenyl groups noted above, the phenyl or aryl groups in the photosensitizing catalysts can have any or a combination of such substituents, for example, as alkyl groups, e.g., methyl, ethyl, propyl, isopropyl, butyl, isobutyl, secondary butyl, tertiary butyl, n-amyl, isoamyl, tertiary amyl, n-hexyl, decyl, dodecyl, etc., alkoxy substituents, e.g., methoxy, ethoxy, isopropoxy, butoxy, hexyloxy, etc.; halogen substituents, e.g., bromine, chlorine, fluorine and iodine; and any other substituents which do not change the fundamental aromatic character of the groups. As used herein, the terms aryl and phenyl are intended to include all groups which are essentially aromatic and which contain one or more benzene rings.

Other very active aromatic-substituted porphyrin catalysts are the tetrabenzo porphyrins, i.e., porphyrins in which the pyrrole rings of the porphyrin structure are fused to benzene rings, the said fused structures constituting isoindole groups. The basic structure of these compounds is illustrated by the following formula:

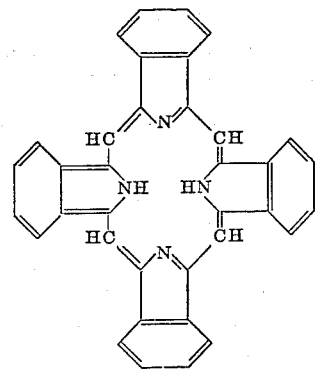

It will be realized, of course, that the above structure can be varied somewhat without destroying the exceptional photosensitizing activity characteristic of the structure. For example, the benzo groups can have alkyl substituents, or can be fused to another benzene ring, thereby constituting a naphthalene structure fused to the pyrrole rings, at the $\alpha$, $\beta$ positions or at the $\beta,\beta'$ positions of the naphthalene group. Another useful class of catalysts is the tetrabenzomono- and -diazo-porphyrins. Any of the methine groups, —CH=, in the tetrabenzomono- or -diaza-porphyrins can be substituted by various organic radicals, such as phenyl and other aryl radicals, alkyl radicals, etc., without destroying the catalytic activity of the compounds, and in some cases improving the activity.

Still another group of porphyrins which are improved photosensitizers are the porphyrins as represented by Formula I above in which R is a heterocyclic group. For example, R can be such monocyclic heterocyclic groups as furyl, thienyl, pyridyl, thiazoloyl, tetrazolyl, diazolyl, triazolyl, pyrryl, quinolyl, oxazolyl, oxadiazolyl, pyrazolyl, imidazolyl, etc.; bicyclic or other polycyclic heterocyclic groups are also applicable, particularly those having a benzene or naphthalene ring fused to a monocyclic heterocyclic group, such as one of the foregoing monocyclic groups; for example, such polycyclic groups as indolyl, benzothienyl, benzofuryl, benzooxazolyl, benzoisoxazolyl, benzthiazolyl, benzimidazolyl, etc., as applicable. The named illustrative groups will ordinarily be used in α,β,γ,δ-tetra-heterocyclic porphyrins. While heterocyclic groups in general are applicable in the photoxidation catalysts employed in the present process, the heterocyclic groups are preferably 5- or 6-member ring compounds, per se, or fused to aromatic structures, with 1 to 4 hetero atoms such as oxygen, nitrogen and sulfur and containing unsaturation, particularly conjugated unsaturation; such heterocyclic groups apparently cause photoxidizing activity in the porphyrin structure by providing more resonance possibilities.

Another group of active photosensitizing catalysts are the octaphenylporphyrins and porphyrazines as represented by the basic formula:

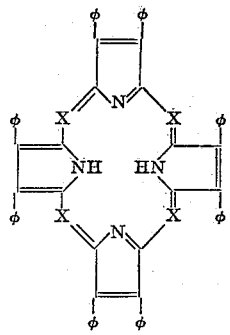

The various improved catalysts which can be utilized in our novel photoxidation process can, in general, be represented by the following structural formula:

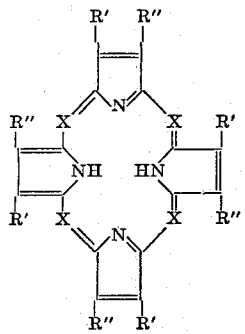

in which each X is selected from $=C(R)-$ and $=N-$ groups but no more than two X's are $=N-$ groups, and each R is selected from H, phenyl groups and heterocyclic groups, and each R' and R'' individually is selected from hydrogen, and phenyl groups, and R' and R'' taken together can form a benzene ring fused to the β positions of the pyrrole rings, and the compound contains at least one of the groups containing aromatic or heterocyclic conjugated unsaturated linkages which impart superior photosensitizing activity to the compound.

Of course, the use of the metal chelate forms of the above structure is also included in the present invention. Such metals as, for example, zinc, magnesium, copper, iron, nickel, cobalt, lead, etc., can readily be chelated with porphyrins, and the resulting chelates are effective as photosensitizers. The chelates can be represented by the above porphyrin structure, with the following bonding between the metal and the pyrrole nitrogens:

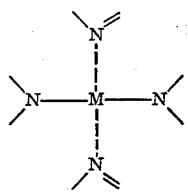

Various other metals also form chelates of the described porphyrins which are effective as catalysts, e.g., alkali and alkaline earth metals such as sodium, potassium, calcium, etc. It will be understood that when porphyrins are described herein, generically or specifically, by structural formula or otherwise, the metal chelate forms as well as the free bases are contemplated.

The general photosensitizing use of the various foregoing very active photosensitizers in photoxidation in general of photoxidizable substrates, including olefins, is described and claimed in the following applications of one of us, Dexter B. Sharp, which were filed of even date herewith: S.N. 696,063; S.N. 696,064; S.N. 696,061; S.N. 696,065; S.N. 696,066.

Methods of preparing the foregoing very active photosensitizers are described in the aforementioned copending applications of Dexter B. Sharp and any of the catalysts prepared by the methods there described can be utilized in the present procedures; in addition, any known prior art methods for preparing any of the foregoing compounds, or any other methods of obtaining the compounds, can be used.

In addition to the highly active photosensitizers described above, many other photosensitizing catalysts can be used in the photoxidation of 2-methyl-2-butene but the results will be inferior. For example, such materials as chlorophyll, eosin, methylene blue, methyl violet, fluorescein, hemin, rubrene, anthracene, tetracene, acridine, and any other catalysts capable of photosensitization in photoxidation procedures can be used. It is also possible to utilize phthalocyanines for this purpose. The above materials can be in any form capable of causing photosensitization; e.g., any of the pure or impure forms of chlorophyll, leaf extracts, etc., can be used so long as they cause photosensitization.

The amount of photosensitizer can vary widely, but ordinarily only small "catalytic" amounts will be used. For example, amounts of 0.005% by weight based on the weight of 2-methyl-2-butene are satisfactory. Various other amounts, e.g., from about 0.0001% up to about 1% or more by weight of the 2-methyl-2-butene can be used. The photoxidation will generally be conducted in the absence of solvent. However, various organic solvents can be used for the reaction, and even water may be present during the reaction. The use of solvent will be advantageous in some cases to aid the mutual intersolubility of 2-methyl-2-butene and particular photosensitizers. Examples of a few suitable solvents are aromatic hydrocarbons, such as benzene, toluene, etc.; acyclic and cyclic alkanes, e.g., n-hexane and cyclohexane; amines, e.g. pyridine, etc. Temperature does not have a strong influence on the photoxidation reaction. However, it is desirable to keep the 2-methyl-2-butene in the liquid or solution state, and it boils at 37–38° C. at atmospheric pressure. Temperatures of the order of room temperature, e.g., 20 to 30° C. will generally be used; cooling procedure may be necessary to maintain these temperatures. Other temperatures, e.g., from 0° to 37° C. can be used; if the reaction is conducted at superatmospheric pressures, the 2-methyl-2-butene will remain in the liquid state at temperatures above 37° C.

The rate of oxygen addition during the photoxidation can vary greatly, although it may affect the time required to complete the reaction. Generally, the addition rate will be at least sufficient to provide all the oxygen which can be absorbed and utilized at a given time. Various types of agitators, mixers, and gas-liquid contact apparatus and procedures can be utilized to promote rapid absorption of oxygen by the 2-methyl-2-butene, thereby insuring a sufficiently high effective oxygen concentration; the concentration of oxygen can also be increased by use of pressure. Oxygen gas can be utilized as such, or it can be admixed with nitrogen or other gases. Air is an oxygen-containing gas which is very suitable for use in the photoxidation of 2-methyl-2-butene; it will be understood that the term "oxygen" as used in the present specification and claims includes molecular oxygen in air or in admixture with other gases, or dissolved in or admixed with liquids, or generated in situ, as well as oxygen per se.

Sodium sulfite is a very effective reducing agent for reduction of the 2- and 3-methyl-3-buten-2-yl hydroperoxides to 2- and 3-methyl-3-buten-2-ols. The reduction generally takes place at temperatures of about 40° to about 90° C. It is also possible to utilize various other reduction procedures to reduce the 2- and 3-methyl-3-buten-2-yl hydroperoxides to the corresponding alcohols in the isoprene process of the present inveniton. For example, such agents or procedures as the following can be used: zinc and acetic acid, stannous chloride in alcohol, lithium aluminum hydride, lithium borohydride, hydrogenation under mild and selective conditions; sodium and alcohol will be effective, but less preferred; and various other reducing means can be used which will occur to those skilled in the art now that the reduction of 2- and 3-methyl-3-buten-2-yl hydroperoxides has been effected in the isoprene process of the present invention.

For the dehydration of 2-methyl-3-buten-2-ol and mixtures of 2- and 3-methyl-3-buten-2-ols, dehydration over magnesium sulfate is a very suitable procedure. This procedure not only produces high yields of isoprene, of the order of 95%, but produces isoprene of very high purity with little or no purification procedure. For the vapors are simply collected by condensation after passing over the magnesium sulfate catalyst, and the important $C_5$ hydrocarbon part of the product is of purity better than 99%. This high purity is even more remarkable when it is noted that a single set of reaction temperature and other operating conditions is effective in causing such complete and straightforward dehydration of a mixture of secondary methyl-3-butenol and a tertiary methyl-3-butenol; for these structurally different methyl-3-butenols would be expected to be markedly different in their dehydration proclivities. The dehydration over magnesium sulfate can take place at such temperatures, for example, as from about 200° to about 300° C.; generally, temperatures in the range of 230° to 280° C. will be used, for example, temperatures around 250° C. are very suitable. The 2- and 3-methyl-3-buten-2-ols will be kept in contact with the magnesium sulfate long enough for the reaction to reach substantial completion.

Various other dehydrating agents, catalysts, and procedures, which are less suitable than the above magnesium sulfate dehydration, can be used to dehydrate 2- and 3-methyl-3-buten-2-ols to isoprene in the present process for converting 2-methyl-2-butene to isoprene. For example, such materials as alumina, silicates, calcium sulfate, etc. can be used to effect the dehydration. Alumina will generally be used in a vapor contact system at temperatures of, for example, about 250° to about 450° C. Such silicate catalysts as, for example, Houdry Type S–65 (86% silica, 12% $Al_2O_3$) can be used at similar temperatures. Calcium sulfate will be utilized at temperatures similar to those for magnesium sulfate. Various other examples of catalysts and procedures which are applicable with varying degrees of efficiency to the dehydration of mixtures of 2- and 3-methyl-3-buten-2-ols will occur to those skilled in the art now that it has been shown that the dehydration of this alcoholic mixture to isoprene of high purity can be effected in an efficient manner. The dehydration reaction is preferably conducted in an inert atmosphere, e.g., under nitrogen or carbon dioxide; pressures close to atmospheric pressure will generally be used, although higher or lower pressures can be used.

A method of converting 2-methyl-2-butene to isoprene via photoxidation, reduction and dehydration steps has been described. A method of converting isopentane to 2-methyl-2-butene and thence to isoprene via photoxidation, reduction and dehydration has also been described.

What is claimed is:

1. A process for preparing isoprene from an isopentene which comprises photoxidizing 2-methyl-2-butene in the presence of a photosensitizer to 2- and 3-methyl-3-buten-2-yl hydroperoxides, reducing the said hydroperoxides to 2- and 3-methyl-3-buten-2-ols, separating unreacted 2-methyl-2-butene from reaction mixture and recycling it to the photoxidizing procedure, and dehydrating the said buten-2-ols to isoprene.

2. The process of claim 1 in which the dehydration takes place over magnesium sulfate at temperatures of 200 to 300° C.

3. A process for preparing isoprene which comprises contacting 2-methyl-2-butene with oxygen in the presence of a photosensitizer and while irradiating the said 2-methyl-2-butene with light to produce 2- and 3-methyl-3-buten-2-yl hydroperoxides, reducing said hydroperoxides to 2- and 3-methyl-3-buten-2-ols, and dehydrating the said buten-2-ols to isoprene.

4. A process for preparing isoprene which comprises contacting 2-methyl-2-butene in liquid state at about room temperature and under visible light irradiation of high intensity with oxygen in the presence of a photosensitizer to obtain a mixture of 2- and 3-methyl-3-buten-2-yl hydroperoxides, reducing said hydroperoxide mixture to a mixture of alcohols by addition to an aqueous solution of sodium sulfite at temperatures of about 40° to about 90° C., and dehydrating said mixture of alcohols by conducting it in the vapor phase over an anhydrous magnesium sulfate catalyst at temperatures of 200 to 300° C., and cooling and condensing the isoprene product.

5. A process for preparing 2- and 3-methyl-3-buten-2-yl hydroperoxides which comprises contacting 2-methyl-2-butene with oxygen in the presence of a photosensitizer and under the influence of visible light to form the said hydroperoxides.

6. The method of claim 5 in which the oxygen is provided by contacting the 2-methyl-2-butene with oxygen.

7. The method of claim 5 in which the oxygen gas is provided by contacting the 2-methyl-2-butene with air.

8. A process for preparing 2- and 3-methyl-3-buten-2-yl hydroperoxides which comprises contacting 2-methyl-2-butene with oxygen in the presence of a photosensitizer, the amount of said photosensitizer being in the range of 0.0001% to 1% by weight, based on the 2-methyl-2-butene, and under irradiation from a light source of at least 1,000 watts.

References Cited in the file of this patent

UNITED STATES PATENTS

| | | |
|---|---|---|
| 1,026,691 | Merling et al. | May 21, 1912 |
| 1,179,408 | Delbruck et al. | Apr. 18, 1916 |
| 2,558,844 | Gray et al. | July 3, 1951 |
| 2,732,337 | Togel | Jan. 24, 1956 |

OTHER REFERENCES

Tishchenko: "Chemical Abstracts," vol. 31, 1937, page 2165.

Taylor et al.: "Journal of Amer. Chem. Soc.," vol. 63, 1941, pages 2756–7.